United States Patent

[11] 3,540,464

| [72] | Inventor | Nicholas Albert Renzi, Trumbull, Connecticut |
|---|---|---|
| [21] | Appl. No. | 710,307 |
| [22] | Filed | March 4, 1968 |
| [45] | Patented | Nov. 17, 1970 |
| [73] | Assignee | Avco Corporation Stratford, Connecticut a corporation of Delaware |

[54] FLOW CONTROL VALVES
3 Claims, 4 Drawing Figs.

[52] U.S. Cl. ................................................. 137/221, 251/30
[51] Int. Cl. ..................................................... F16k 1/12, F16k 31/06
[50] Field of Search.......................................... 137/219, 220, 221, 625.64; 230/114C; 251/30

[56] References Cited
UNITED STATES PATENTS

| 3,455,532 | 7/1969 | Barker........................... | 251/30X |
| 2,679,856 | 6/1954 | Gerritsen et al. ............... | 137/221 |
| 3,018,617 | 1/1962 | Kelgard......................... | 230/114CX |
| 3,123,283 | 3/1964 | Leis.............................. | 230/114C |
| 3,354,896 | 11/1967 | Ferrill........................... | 137/219 |

FOREIGN PATENTS

| 837,114 | 6/1960 | Great Britain................. | 137/625.64 |

Primary Examiner—M. Cary Nelson
Assistant Examiner—Michael O. Sturm
Attorney—Charles M. Hogan and Gary M. Gron ABSTRACT: The disclosure illustrates a miniaturized operator-controlled valve for use in controlling the flow of pressurized heated compressor discharge air from a gas turbine engine to the engine inlet for deicing purposes. The valve comprises an inner and outer housing and a displaceable piston telescoped into the inner housing so that the outer face of the piston is exposed to the air stream. A solenoid is positioned in the inner housing to actuate a valve assembly which pressurizes or depressurizes the interior side of the piston, thereby causing the piston to extend to a closed position or to retract to an open position. The solenoid valve is arranged so that when the solenoid is deenergized the miniaturized valve permits flow of deicing air.

Patented Nov. 17, 1970
3,540,464
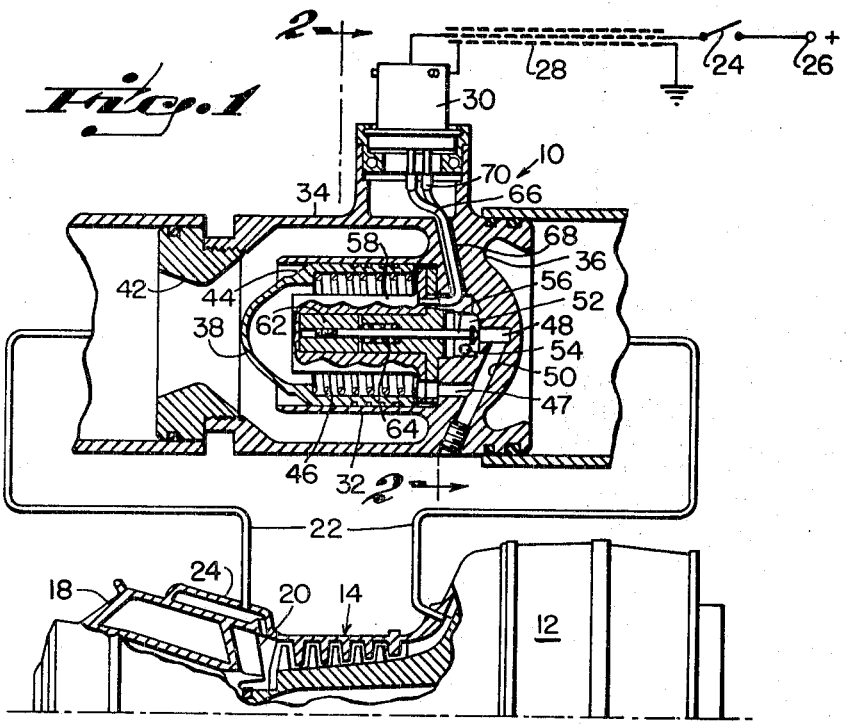
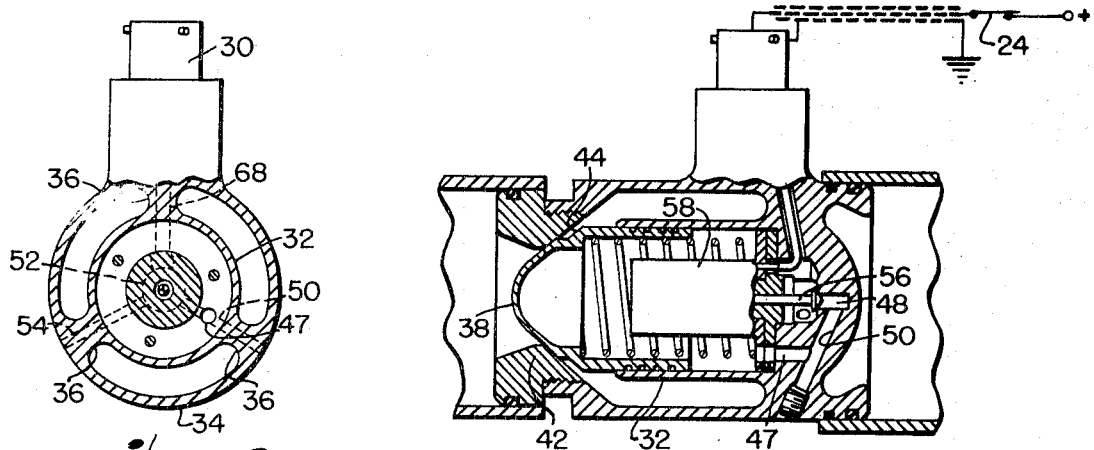
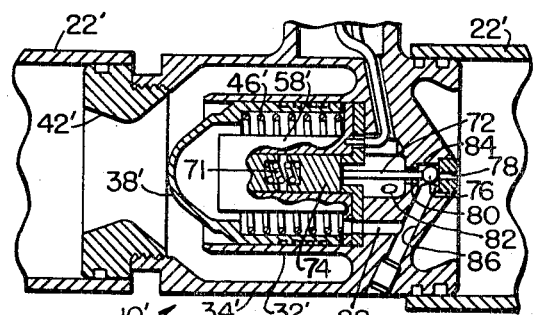
INVENTOR.
NICHOLAS A. RENZI
BY Charles M. Hogan
Gary M. Brow
ATTORNEYS.

FLOW CONTROL VALVES

The present invention relates to valve assemblies and more specifically to valve assemblies used to control the flow of fluid.

Many uses for flow control valves are found in the gas turbine engine. One particular application is that of controlling flow of heated compressor discharge air to the inlet of an engine for preventing the buildup of ice on the inlet components. These valves are located on the engine and operator or pilot controlled from a remote location. It has been found that this type of valve is conveniently actuated from the remote source by utilizing a solenoid on the valve assembly, which is electrically energized from the remote location. While this generally provides an effective means of controlling flow, present solenoid-actuated valves are rather bulky and have a substantial portion of the valve extending outward from the conduit carrying the deicing air. As engines become more complex and require a greater number of auxiliary control and accessory devices, the space around the engine housing is at a premium. The extra space taken up by the valve assembly then becomes a disadvantage, both from the standpoint of space and from the standpoint of serviceability.

Accordingly, it is an object of the present invention to provide a highly compact, simplified and effective valve assembly for controlling flow of fluid.

The above objects are broadly achieved by a flow control valve assembly comprising a housing mounted in and surrounded by a fluid stream and a piston supported by the housing and displaceable between a first position for permitting fluid flow and a second position for blocking flow. Means are provided for establishing differential forces across the piston means to selectively urge the piston between the first and second positions. A solenoid is positioned in the housing for actuating the differential force means, whereby the piston is displaced between the positions.

The above and other related objects and features of the present invention will be apparent from a reading of the description of the disclosure found in the accompanying drawing and the novelty thereof pointed out in the appended claims.

In the drawing:

FIG. 1 is a longitudinal section view of a valve assembly embodying the present invention, together with related components of a gas turbine engine with which the valve assembly may be used, the valve assembly being illustrated in a deenergized, or open position;

FIG. 2 is a view taken on lines 2-2 of FIG. 1;

FIG. 3 illustrates the valve assembly of FIG. 1 in an energized, or closed position;

FIG. 4 illustrates a valve assembly including an alternate embodiment of the present invention.

Reference is had to FIG. 1 which illustrates a valve assembly 10, together with the corresponding components of a gas turbine engine 12 with which the valve 10 may be used. The gas turbine engine 12 has a compressor unit 14, driven by a turbine (not shown) which pressurizes air for delivery to a combustor (also not shown) for generation of a propulsive gas stream. In order to prevent the accumulation of ice on inlet struts 18 and inlet vanes 20 of the compressor unit 14, a portion of the air pressurized and heated by the compressor 14 is routed through a conduit 22 to a distribution manifold 24 adjacent the inlet struts 18 and vanes 20. The valve assembly 10 is interposed in the conduit 22 to control the flow of deicing air. The valve 10 is energized from a remote location, such as the cockpit of an aircraft, by operator or pilot manipulation of a switch 24 which connects a source of voltage at terminal 26 to a coaxial cable 28 which extends to an electrical input connector 30 on the valve assembly 10.

The valve assembly 10 comprises inner and outer generally cylindrical housings 32 and 34, respectively. The inner housing 32 is surrounded by the pressurized fluid flow path and is supported relative to the outer housing 34 by a plurality of integral struts 36 (shown particularly in FIG. 2). A piston 38 is telescoped into the downstream end of the inner housing 32. The piston 38 is displaceable between the retracted position shown, which permits flow of air, and the extended position (shown in FIG. 3) in which the aft end of the piston 38 seats against a throat portion 42 of the outer housing 34. The inner housing 32 has a streamlined upstream end and the piston 38 has a streamlined downstream end to minimize flow losses.

The piston 38 has an annular radially extending recessed surface 44 which is positioned so that when the piston 38 is seated against the throat 42 the annular area is exposed to the upstream pressure to cause a resultant axial force in a direction tending to retract the piston 38. A spring assembly 46 acts on the interior side of the piston element 38 to urge it towards the throat 42. A bleed passageway from the pressurized flow path through the outer housing to the interior side of the piston 38 is provided by providing a control clearance between the outer walls of the piston 38 and the corresponding bore in the inner housing 32. A flow path from the interior side of the piston 38 to a low pressure source exterior of the pressurized flow path is provided by axial ports 47, 48, generally radial port 50, chamber 52, and port 54, which extends through one of the struts to the exterior side of the outer housing 34. Flow of fluid through this latter-mentioned flow path is permitted or blocked by the displacement of a plunger 56 away from or against the open end of axial port 48.

The plunger 56 is displaced by a solenoid assembly 58 suitably secured to the forward end of the inner housing 32. The solenoid assembly 58 may be selected from a number of miniaturized solenoids for this purpose. As seen in the exemplary showing of FIG. 1, the solenoid 58 has a movable core 62 connected to the plunger 58 and biased by a spring 64 to hold the plunger 56 away from the axial port 48. The solenoid 58 also has a coil assembly (not shown) which, when energized by electrical current through input leads 66, displaces the core 62 to seat the plunger 56 against the port 48. The input wires 66 extend through a generally radial passageway 68 formed in one of the struts 36 to the terminals 70 of the coaxial input connector 30.

The valve assembly 10 operates in the manner described below.

The compressor 14 produces a source of pressurized air in the conduit 22 upstream of the valve 10. In the condition illustrated in FIG. 1 the switch 24 is in an open position, the solenoid 58 is deenergized and the plunger 56 displaced away from the port 48 to permit flow of air from the interior side of the piston 38 to the low pressure exterior source. In so doing the fluid pressure acting against the interior side of the piston 38 is reduced to substantially that of the low pressure source. This low pressure is maintained because the clearance between the piston 38 and the interior housing 32 is only sufficient to permit a bleed flow of pressurized fluid to the interior side of the piston 38. Because the outer side of the piston 38 extending from the housing 32 is exposed to the pressurized fluid in the conduit 22, the piston 38 is maintained in the retracted position of FIG. 1 against the action of the biasing spring 46. This position is maintained as long as pressurized air is available in conduit 22 and the switch 24 remains in the open position.

When it is desired to place the valve 10 in a closed position, the switch 24 is closed, as shown in FIG. 3, to energize the solenoid 58 and cause the plunger 56 to block flow of fluid from the interior side of the piston 38 to the low pressure exterior source. The pressure on the interior side of the piston 38 then builds up to that of the fluid stream pressure due to the bleed flow between the piston 38 and the housing 32. The pressure on opposite sides of the piston 38 then becomes equal and the spring 46 then urges the piston 38 to an extended position against the throat 42. The valve 10 will thus remain in this position as long as the solenoid 58 is energized.

To again open the valve 10, the solenoid 58 is deenergized to permit depressurization of the interior side of the piston 38. When this happens the force acting on the recessed radial area 44 acts to urge the piston 38 towards a retracted position. To permit the piston to be actually displaced the spring constant and the recessed area must be proportioned to permit a resultant axial force in a retracted direction for normal conditions. The piston is then fully retracted against the action of the spring 46 by the fluid stream pressure acting on the recessed area 44.

It is apparent that the valve assembly described above is a highly compact and simplified valve assembly which has a negligible space requirement other than the space taken up by its insertion in the conduit with which it is used. It is further evident that, because of the streamlined nose of the housing 32 and throat 42, valve 10 presents a minimum loss in flow characteristics. It should also be noted that in the particular environment illustrated the valve is adapted to be in the open position for deenergization of the solenoid 58 so that in the event of a power failure deicing air would continue to be available for the inlet of the engine.

While the valve assembly shown in FIGS. 1—3 is a highly compact and simplified miniature valve assembly, the valve assembly of FIG. 4 is another embodiment of the same invention and gives equivalent excellent results. In this embodiment the valve 10' has inner 32' and outer 34' housings interconnected by integral struts 36'. A similar piston 38' is telescoped into the downstream end of the housing 32' and is adapted to extend against a throat 42'. A spring 46' acting on the interior side of the piston 38' urges it towards an extended position. A similar solenoid 58' is mounted in the forward end of the housing 32' and has an output rod 72 connected to a movable core 74. A spring 71 biases the core 74 and rod 72 to urge a displaceable ball element 76 in a chamber 84 against an inlet port 78 connected to the pressurized flow path. The ball element 76 is also displaceable against a port 80, as later described. The port 80 connects with a generally radial port 82 which extends to a relatively low pressure source exterior of the pressurized fluid flow path. The chamber 84 is connected to the interior side of the piston 38' by radial passageway 86 and axial passageway 88.

It is apparent then that the ball element 76, when displaced between its two positions, either pressurizes the interior side of the piston 38' by permitting flow through the passageway 78 or depressurizes the interior side by permitting outflow of fluid through the passageways 80 and 82. Thus, to maintain the valve 10' in the illustrated open position, the solenoid 70 is deenergized so that the spring 71 urges the ball element 76 against the port 78 to block flow from the fluid stream. At the same time, the port 80 is open to permit depressurization of the interior side of the piston 38' so that the fluid stream pressure acts on the outer side of the piston 38' to maintain it in a retracted position against the action of the spring 46'.

To place the valve in a closed position the solenoid 70 is energized, thus displacing the rod 72 and the ball 76 away from port 78 and against the port 84 to terminate flow to the low pressure source and permit pressurization of the interior side of the piston 38' to the fluid stream level. With equal pressure forces on opposite sides of the piston 38' the spring 46' is then able to urge the piston to an extended position against the throat 42'. It should be noted that the piston 38' has an annular recessed area 44' to again permit opening of the valve 10' in a fashion similar to the valve of FIG. 1.

I claim:

1. A valve assembly for controlling flow of fluid in a fluid stream extending from the discharge end of a gas turbine engine compressor to its inlet end for preventing the formation of ice, said valve assembly comprising:
    an outer housing interposed in said fluid stream and having an opening therethrough for passage of said fluid stream;
    an inner housing mounted in the opening in said outer housing;
    a plurality of radial struts extending from said inner to said outer housing;
    a piston telescoped into said inner housing and displaceable between a first retracted position for permitting fluid flow through the opening in said outer housing and a second extended position for blocking flow through said outer housing;
    means for forming a radially extending surface on the extended portion of said piston so that pressurized fluid exerts a force on said piston towards a retracted position;
    means for biasing said piston to the extended position;
    means in said inner housing for selectively pressurizing the interior side of said piston to the level of said fluid flow path and for connecting the interior side of said piston through one of said radial struts to a low pressure source exterior of said outer housing; and
    a solenoid means positioned in said inner housing, energizable and and deenergizable for actuating said selective pressurizing and depressurizing means, said solenoid being substantially surrounded by the interior of said piston when the piston is in its retracted position.

2. A valve assembly as in claim 1 wherein said selective pressurizing and depressurizing means comprises:
    a passageway from the interior side of said piston through one of said struts to a low pressure source exterior of said outer housing;
    a plunger selectively displaceable into said passageway for permitting and blocking flow of fluid in response to energization and deenergization of said solenoid means;
    said piston and said housing having a sufficient clearance between the telescoped portions therebetween to permit a bleed flow path of fluid from the fluid stream to the interior side of said piston whereby when said flow path to the exterior low pressure source is blocked the interior side of said piston is pressurized to the level of said stream, thereby extending it to a flow blocking position and when the flow to said exterior low pressure source is permitted, the interior side of said piston is depressurized and the bleed flow path across said piston produces a sufficient pressure drop to maintain the fluid pressure forces tending to retract the piston greater than the forces tending to extend it.

3. A valve assembly as in claim 2 wherein energization of said solenoid blocks flow to said exterior low pressure discharge whereby upon failure of said solenoid, flow of deicing air is maintained.